W. A. WATKINS.
Corn-Planters.

No. 151,813.

Patented June 9, 1874.

WITNESSES:

INVENTOR:
W. A. Watkins
BY
ATTORNEYS.

UNITED STATES PATENT OFFICE.

WILLIAM A. WATKINS, OF CULLEOKA, TENNESSEE.

IMPROVEMENT IN CORN-PLANTERS.

Specification forming part of Letters Patent No. 151,813, dated June 9, 1874; application filed February 7, 1874.

*To all whom it may concern:*

Figure 1:
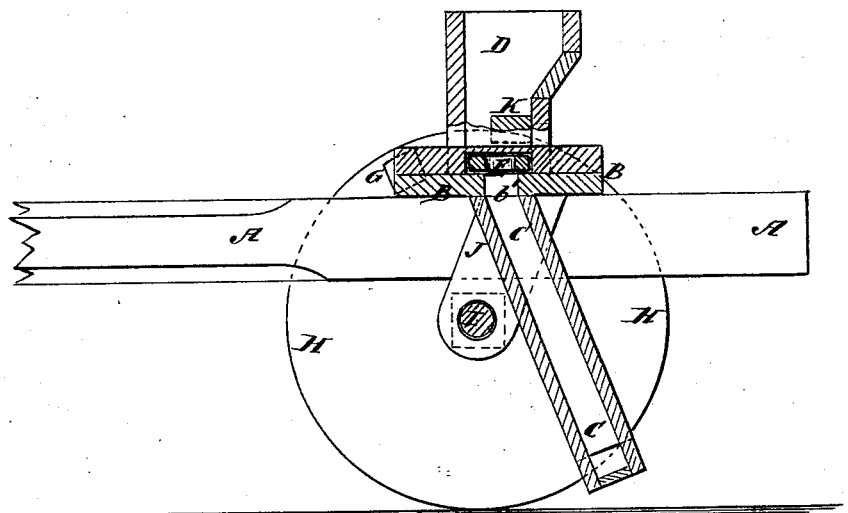
Figure 2:
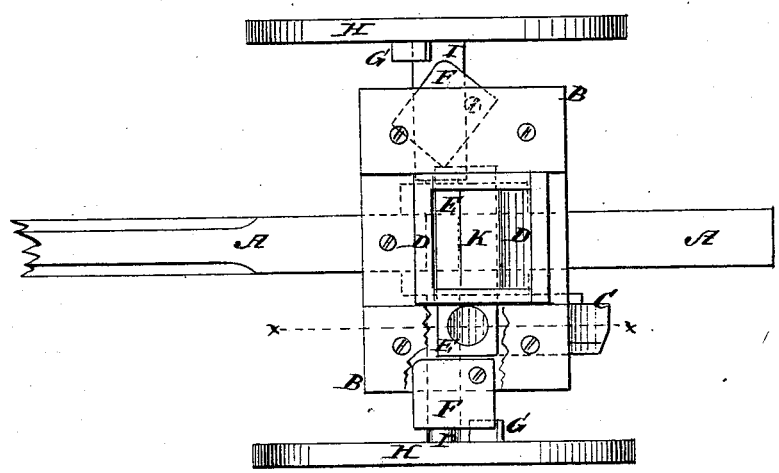

Be it known that I, WILLIAM A. WATKINS, of Culleoka, in the county of Maury and State of Tennessee, have invented a new and useful Improvement in Corn-Planters, of which the following is a specification:

Figure 1 is a vertical section of my improved planter, taken through the line $x\ x$, Fig. 2. Fig. 2 is a top view of the same, part being broken away to show the construction.

Similar letters of reference indicate corresponding parts.

The invention is an improvement in the class of seed-planters whose hopper-slide is vibrated or reciprocated by means of arms or other projections on the inner side of the transporting-wheels. The improvement relates to the construction and arrangement of parts, as hereinafter generally described and specifically claimed.

A represents the beam of an ordinary plow, to which is attached a small platform, B, through which, a little at one side of the beam A, is formed a hole, $b'$, through which the seed falls into the spout C, attached to the under side of the platform B, and by which the seed is conducted into the furrow close in the rear of the plow. To the middle part of the platform B is attached the hopper D to receive the seed. E is a slide resting upon the platform B, and passing through the sides of said hopper. The slide E forms the bottom of the hopper, and has a hole formed in it near one end, of such a size as to hold the exact quantity of seed required for a hill. When more or less seed is required for a hill, or when larger or smaller seeds are to be planted, the slide E is changed for one having a larger or smaller hole, as may be desired. The slide E should be of such a length that its ends may never enter the hopper D, and never come quite to the side edges of the platform B. Upon the platform B are placed square blocks F, of the same thickness as the slide E, and which are pivoted at one corner to the said platform B. The blocks F project so that they may be struck alternately by blocks or projections G, attached to the inner sides of the wheels H, to push the slide E back and forth. The block G, that pushes the slide out to drop the seed, should be a little in advance of the one that pushes the slide in to receive the seed, so that the hole in said slide may be longer within the hopper than it is out of it, to insure its being always properly filled. The wheels H are rigidly attached to the edge I, which revolves in bearings J, attached to the beam A. In the lower part of the hopper D, a little above the slide E, is secured a false bottom, K, extending over about half the area of that part of the hopper, and covering the hole in the slide, so as to relieve the said slide from having to support the weight of the seed in the hopper, and insuring its becoming properly filled. In the upper side of the slide G, in the rear of the dropping-hole, is formed a short groove or recess, and of such a depth as to allow any kernels that may project above the slide E from being crushed as the slide passes out of the hopper.

Having thus described my invention, I claim as new and desire to secure by Letters Patent—

The rectangular or polygonal plates F F, pivoted in the ends of the platform B, the seed-slide E, and the blocks G, attached to the wheels H H, which are fast on the axle, all constructed, arranged, and operating as shown and described, whereby the slide is reciprocated and its movement arrested by the pivoted plates in alternate succession, as specified.

WILLIAM A. WATKINS.

Witnesses:
W. C. RENFRO,
J. P. SHAW.